US010008957B2

(12) United States Patent
Horiuchi et al.

(10) Patent No.: US 10,008,957 B2
(45) Date of Patent: Jun. 26, 2018

(54) BIDIRECTIONAL SPLIT PI INVERTER WITH DIGITAL COUNTER

(71) Applicants: WINZ CORPORATION, Shizuoka (JP); GODO SANGYO CO., Hiroshima (JP)

(72) Inventors: Shoji Horiuchi, Shizuoka (JP); Nozomi Tan, Shizuoka (JP)

(73) Assignees: WINZ CORPORATION, Shizuoka (JP); GODO SANGYO CO., Hiroshima (JP)

( * ) Notice: Subject to any disclaimer, the term of this patent is extended or adjusted under 35 U.S.C. 154(b) by 0 days. days.

(21) Appl. No.: 15/515,672

(22) PCT Filed: Oct. 10, 2014

(86) PCT No.: PCT/JP2014/077212
§ 371 (c)(1),
(2) Date: Mar. 30, 2017

(87) PCT Pub. No.: WO2016/056126
PCT Pub. Date: Apr. 14, 2016

(65) Prior Publication Data
US 2017/0302167 A1 Oct. 19, 2017

(51) Int. Cl.
*H02M 7/66* (2006.01)
*H02M 7/72* (2006.01)

(52) U.S. Cl.
CPC ............... *H02M 7/66* (2013.01); *H02M 7/72* (2013.01)

(58) Field of Classification Search
CPC .......... H02M 3/158–3/1588; H02M 7/66–7/98
See application file for complete search history.

(56) References Cited

U.S. PATENT DOCUMENTS 4,354,223 A * 10/1982 Turnbull ............. H02M 3/1582
318/811
5,737,168 A * 4/1998 Baker .................... H02H 3/207
361/84

(Continued)

FOREIGN PATENT DOCUMENTS

JP    2008-172952    7/2008
JP    2009-278847    11/2009
JP    2014-027750    2/2014

OTHER PUBLICATIONS

International Search Report, PCT/JP2014/077212, dated Jan. 6, 2015.

(Continued)

*Primary Examiner* — Gary L Laxton
*Assistant Examiner* — Peter Novak
(74) *Attorney, Agent, or Firm* — Young & Thompson

(57) ABSTRACT

Provided is a new control method that causes no time lag or hunting when a power conversion direction is reversed. The power conversion apparatus includes switching elements (S1 and S2) that alternately perform switching and are capable of reversing the power conversion direction without suspension, and an up/down counter register (RT) that has two different thresholds and selects counting up at a smaller threshold, counting down at a larger threshold, and holding of the value between the two thresholds. According to the value of the up/down counter register (RT), a gate pulse is generated to control the switching of the switching elements (S1 and S2).

3 Claims, 4 Drawing Sheets

(56) References Cited

U.S. PATENT DOCUMENTS

| | | | |
|---|---|---|---|
| 6,979,987 B2 * | 12/2005 | Kernahan | H02M 3/157 323/283 |
| 2009/0284080 A1 | 11/2009 | Kojima et al. | |
| 2012/0125869 A1 * | 5/2012 | Abar | F24J 2/5233 211/26 |

OTHER PUBLICATIONS

Inakagata et al., "Efficiency Improvement of AC / DC Power Station," Panasonic Electric Works Technical Report, 2011, vol. 59, No. 3, pp. 4-11 (URL: "HYPERLINK" http://panasonic.co.jp/ptj/pew/593j/pdfs/593#01.pdf "http://panasonic.co.jp/ptj/pew/593j/pdfs/593#01.pdf").

* cited by examiner

BIDIRECTIONAL SPLIT PI INVERTER WITH DIGITAL COUNTER

TECHNICAL FIELD

The present invention relates to a technical field of a power conversion apparatus. More specifically, it relates to a technical field of a nondirectional power conversion apparatus.

BACKGROUND ART

As a prior art, there is a so-called bidirectional converter; however, performing a feedback control by connecting a plurality of converters with each other and by using a common DC bus voltage means that a plurality of voltage feedbacks operate in parallel within a single control system. This causes interference between mutual controls, whereby the control has not been successful.

For example, a bidirectional converter A and a bidirectional converter B are connected in parallel, and a connected part thereof is referred to as a common DC bus. Here, in a case where the bidirectional converter A is regarded as an input side and the bidirectional converter B is regarded as an output side (called a mode A to B), electricity is supplied from an input side of the bidirectional converter A, then the electricity is output to the common DC bus, then the electricity is supplied to an input side of the bidirectional converter B, and finally, the electricity is output to an output side of the bidirectional converter B.

Furthermore, in a case where an output from the bidirectional converter B, which occurs first, is regarded as an input and an input into the bidirectional converter A is regarded as an output (called a mode B to A) in an operating mode, electricity is supplied from the input side of the bidirectional converter B, then the electricity is output to the common DC bus, then the electricity is supplied to the input side of the bidirectional converter A, and finally, the electricity is output to an output side of the bidirectional converter A.

A concept of a main circuit in this manner has been in existence, and operation by switching input and output feedbacks between the mode A to B and the mode B to A has been possible. Note that as a literature related to such background art, Non Patent Literature 1 below, for example, may be listed.

CITATION LIST

Non Patent Literature

Non Patent Literature 1: "Efficiency Improvement of AC/DC Power Station," Panasonic Electric Works Technical Report, 2011, Vol. 59, No. 3, pp. 4-11 (URL: "HYPERLINK "http://panasonic.co.jp/ptj/pew/593j/pdfs/593#01.pdf" http://panasonic.co.jp/ptj/pew/593j/pdfs/593#01.pdf")

SUMMARY OF THE INVENTION

Technical Problem to be Solved

In the above-described bidirectional converter, however, operating the feedbacks of the mode A to B and the mode B to A at the same time makes a voltage feedback and a proportional-integral-derivative (PID) control impossible, whereby it is not possible to control the converter. That is, in a case where a power conversion direction is reversed, it is not possible to control the converter by a normal voltage feedback, whereby it has not been possible to operate it as a reversible converter or a nondirectional converter.

Furthermore, in view of a high-reliability demand and high power control in recent years, a digital control using a micro processing unit (MPU) is inevitable; however, in the digital control, a calculation result changes in steps. The number of steps is about one thousand from a practicality viewpoint, whereby an amount of change per step becomes large to some extent. At this time, when impedance is low such as in a case where a power source is constituted of a capacitor, it has not been possible to achieve stable control due to a drastic current change or a so-called hunting phenomenon in which electricity is reversed by ups and downs of one step.

Accordingly, the present invention has been devised in view of each of the above-described problems, and an exemplary objective thereof is to provide a reversible or nondirectional power conversion apparatus of practical use and a new method for controlling the same.

Means for Solving the Problem

To solve the above-described problems, in the present invention, a converter having a switching element, which alternately performs switching, is controlled by an up/down counter register, which has two thresholds different from each other, by generating a gate pulse.

Furthermore, the present invention is a two-stage converting converter including a first converter having two thresholds different from each other, and a second converter having two thresholds that are different from each other and outside of the thresholds of the first converter. The first and second converters are connected in parallel by a common DC bus, and input and output thereof are separately controlled.

DESCRIPTION OF EMBODIMENTS

A method for controlling according to the present invention is described herein.

(I) First Embodiment

First, an example of a basic principle circuit according to a first embodiment is described with reference to FIGS. 1 to 4.

Figure 1:
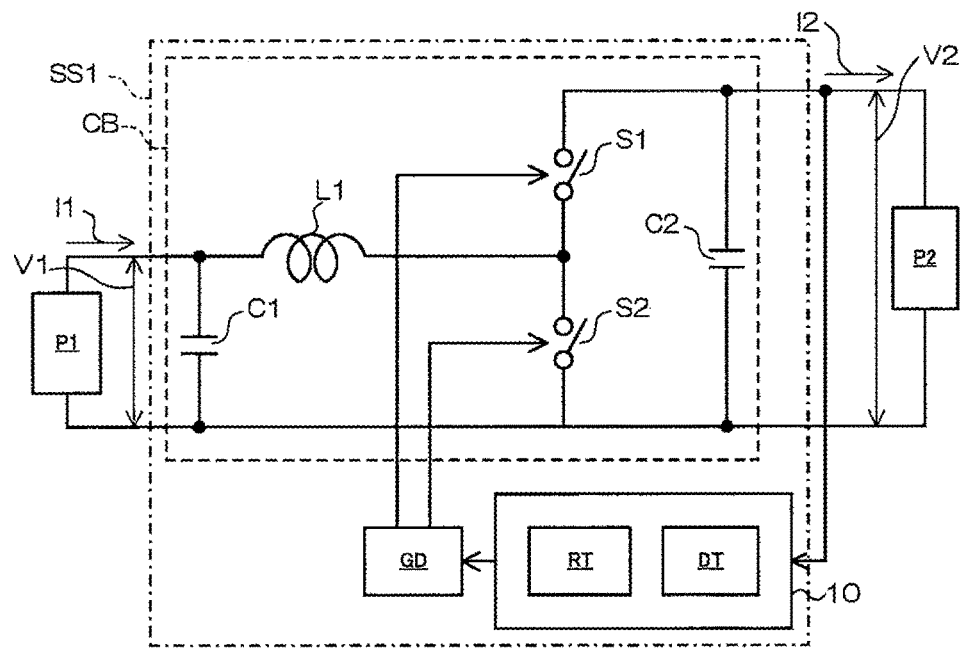
FIG. 1 is a circuit diagram illustrating an example of a basic principle circuit according to a first embodiment.

A converter CB according to the first embodiment illustrated in FIG. 1 is a converter included in a power conversion apparatus SS1 according to the first embodiment. The converter CB comprises a power conversion unit in which a switching element S1 and a switching element S2 alternately perform switching. For a voltage V2 of a load/power source P2 (hereinafter, simply referred to as a "voltage V2" in the first embodiment) detected by a detection unit DT, the converter CB generates a gate pulse by an up/down counter register RT, which has a threshold (A+) and a threshold (A−) exemplified in FIG. 3 and is provided to a micro processing unit (MPU) 10, so as to control the voltage V2 to be approximately within a range of the threshold (A+) and the threshold (A−). The power conversion unit also includes a reactor L1 as well as a capacitor C1 and a capacitor C2 illustrated in FIG. 1 in addition to the above-described switching element S1 and the switching element S2.

Figure 2:
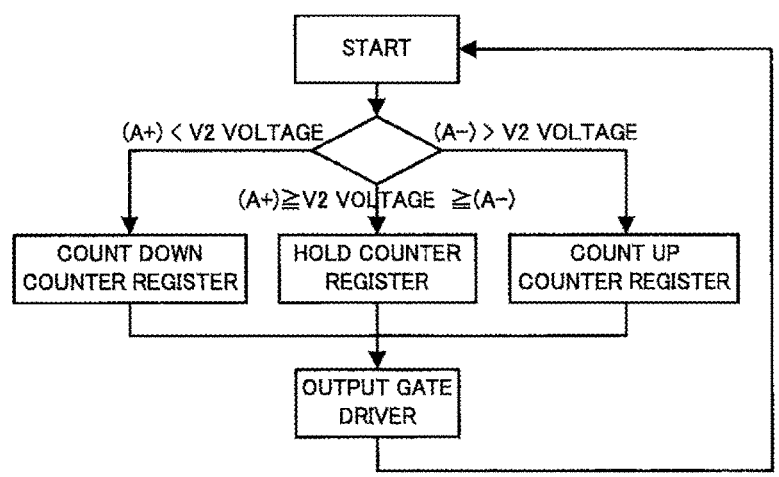
FIG. 2 is a flowchart illustrating software control of a converter CB in the basic principle circuit according to the first embodiment.

Next, in FIG. 2, a flowchart of software control of the converter CB illustrated in FIG. 1 is illustrated.

Figure 3:
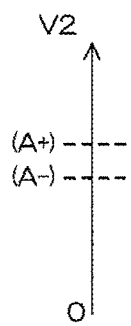
FIG. 3 is a graph illustrating control thresholds of the converter CB according to the first embodiment.
Figure 4:
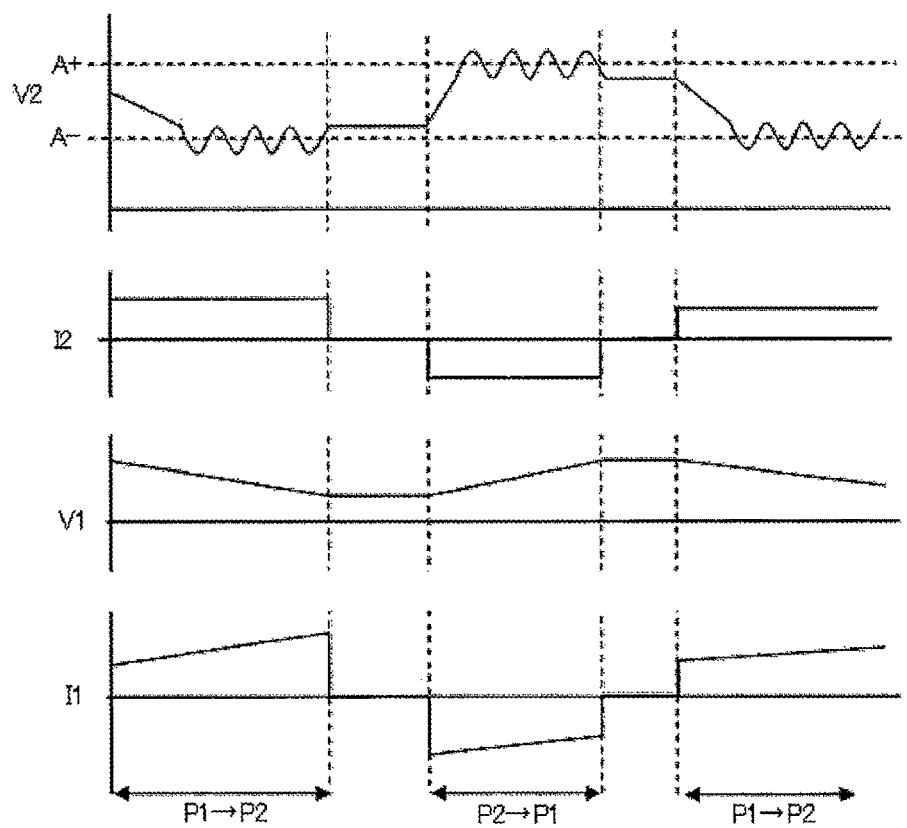
FIG. 4 is a graph illustrating transition of current and voltage of the converter CB according to the first embodiment in a case where a load/power source P1 is a capacitor.

A basic method for controlling the converter CB illustrated in FIG. 1 is as described below using FIGS. 3 and 4.

First, in a case where electricity is supplied from a load/power source P1 and where the load/power source P2 consumes the electricity as a load, the voltage V2 is decreased by increasing the load. When reaching threshold (A−)>voltage V2, counting up of the up/down counter register RT is performed as illustrated in FIG. 2. When a count value of the up/down counter register RT becomes large, an output from a gate driver GD is output so as to increase an ON time on a switching element S2 side and to decrease an ON time on a switching element S1 side.

As a result, a step-up ratio is increased so as to suppress a voltage decrease of the voltage V2.

Here, in a case where the load/power source P1 is a capacitor, although a terminal voltage V1 thereof gradually decreases accompanying discharge of electricity, the step-up ratio increases for a while, whereby the voltage V2 is kept near the threshold (A−).

Next, in a case where consumption of electricity by the load/power source P2 ends, the voltage V2 immediately exceeds the threshold (A−) and enters a control dead zone, and the count value of the up/down counter register RT is held. Accordingly, the step-up ratio is fixed, and the voltage V2 keeps a fixed voltage with no fluctuation.

Next, a case where the electricity is supplied from the load/power source P2 is described. The voltage V2 is increased as the electricity is supplied from the load/power source P2; however, since the step-up ratio is fixed since the count value of the up/down counter register RT is held due to entering the above-described control dead zone, a direction of current is reversed. Thus, operation transits into that of a step-down converter, but power conversion is performed using the same step-up/down ratio.

In the case where the load/power source P1 is a capacitor, the terminal voltage V1 thereof gradually increases by receiving stepped down electricity supplied from the load/power source P2. Accordingly, since the step-down ratio is fixed, the voltage V2 gradually increases as well accompanying a voltage increase of the load/power source P1.

When the voltage V2 increases and reaches threshold (A+)<voltage V2, now the up/down counter register RT performs counting down as illustrated in FIG. 2. When a count value of the up/down counter register RT becomes small, an output from the gate driver GD is output so as to decrease the ON time on the switching element S2 side and to increase the ON time on the switching element S1 side.

As a result, the step-down ratio is decreased so as to suppress a voltage increase of the voltage V2.

Here, in a case where the load/power source P1 is a capacitor, although the terminal voltage V1 thereof gradually increases while the electricity is supplied, the step-down ratio decreases for a while, whereby the voltage V2 is kept near the threshold (A+).

In a case where the electricity that has been supplied from the load/power source P2 ends, the voltage V2 immediately falls below the threshold (A+) and enters the control dead zone, whereby ups and downs are not caused, and the count value of the up/down counter register RT is held. Accordingly, the step-down ratio is fixed, and the voltage V2 keeps a fixed voltage with no fluctuation.

Here, setting of the threshold (A+) itself and the threshold (A−) itself is described. As described above, in the converter CB according to the first embodiment, a power conversion direction is reversed between the load/power source P1 and the load/power source P2, and the voltage V2 fluctuates within the range of the threshold (A+) and the threshold (A−). Then, in general, it is suitable to set the threshold (A+) and the threshold (A−) described above such that a difference therebetween is a value from 3% to 5% of an absolute value of the voltage V2 as a range in which the voltage V2 can be regarded as being substantially constant or requiring only a small correction.

In addition, reversal of the power conversion direction between the load/power source P1 and the load/power source P2 is switched by any external factor.

In this way, since the counting up and the counting down by the up/down counter register RT are performed interposing the control dead zone between the threshold (A+) and the threshold (A−), the up/down counter register RT does not transit into the counting down in a routine following the counting up. Thus, as in FIG. 4, a hunting phenomenon, which occurs when the power conversion direction is reversed, can be completely prevented, and it is possible to reverse the conversion direction without any time lag.

(II) Second Embodiment

Next, an example of a basic principle circuit according to a second embodiment is described with reference to FIGS. 5 to 7.

Figure 5:
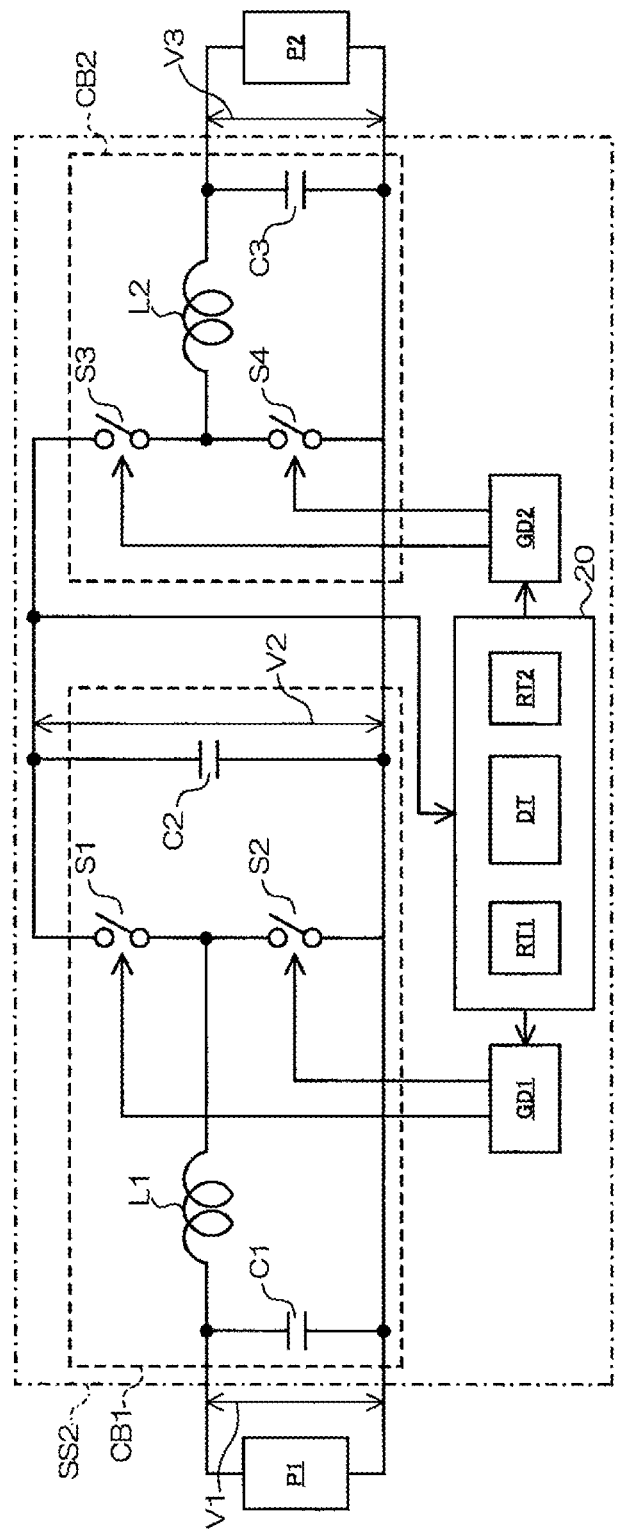
FIG. 5 is a circuit diagram illustrating an example of a basic principle circuit according to a second embodiment.

In a power conversion apparatus SS2 according to the second embodiment illustrated in FIG. 5, a converter CB1, which is constituted of a switching element S1, a switching element S2, a reactor L1, and a capacitor C1 and which has the same configuration as the configuration of the converter CB illustrated in FIG. 1, and a converter CB2, which is constituted of a switching element S3, a switching element S4, a reactor L2, and a capacitor C3, are connected in parallel by a capacitor C2, which is a common DC bus capacitor. The converter CB1 generates a gate pulse by an up/down counter register RT1, which has thresholds of a threshold (A+) and a threshold (A−) and is provided to a MPU 20, and outputs the gate pulse to a gate driver GD1 to drive the switching element S1 and the switching element S2. Furthermore, the converter CB2 generates a gate pulse by an up/down counter register RT2, which has thresholds of a threshold (B+) and a threshold (B−) and is provided to the MPU 20, and outputs the gate pulse to a gate driver GD2 to drive the switching element S3 and the switching element S4.

In control of the converters illustrated in FIG. 5, the converter CB1 having the thresholds of the threshold (A+) and the threshold (A−) controls a voltage V2 of a common DC bus detected by a detection unit DT so that the voltage V2 is suppressed to be within a range of the threshold (A+) and the threshold (A−). Hereinafter, in the second embodiment, the voltage V2 of the common DC bus is referred to as a "voltage V2" as necessary. On the other hand, since the converter CB2 has the thresholds within which the up/down counter register RT2 operates of the threshold (B+) and the threshold (B−), which are outside of the threshold (A+) and the threshold (A−), fluctuation of the voltage V2 of the common DC bus normally does not reach the threshold (B+) and the threshold (B−), whereby operation of the up/down counter register RT2 is not performed.

Control of the up/down counter register RT2 of the converter CB2 of FIG. 5 changes so as to make a voltage setting of a voltage V3 on a load/power source P2 side from a demand as a power conversion system.

That is, in the converter CB2, in a case where electricity is extracted from the load/power source P2 and is supplied to the common DC bus, a count value of the up/down counter register RT2 is counted up in a direction of either increasing the voltage V3, which is a voltage source of the load/power source P2, or increasing the voltage V2.

In contrast, in a case where supply of the electricity to the load/power source P2 is demanded, the count value of the up/down counter register RT2 is counted down in a direction of simply increasing a size of the load of the load/power source P2 or of decreasing the voltage V2 while increasing the voltage V3 on the load/power source P2 side.

The threshold (B+) and the threshold (B−) of the converter CB2 has a function as protection against deviation from the threshold (A+) and the threshold (A−), or a normal operation range.

Figure 6:
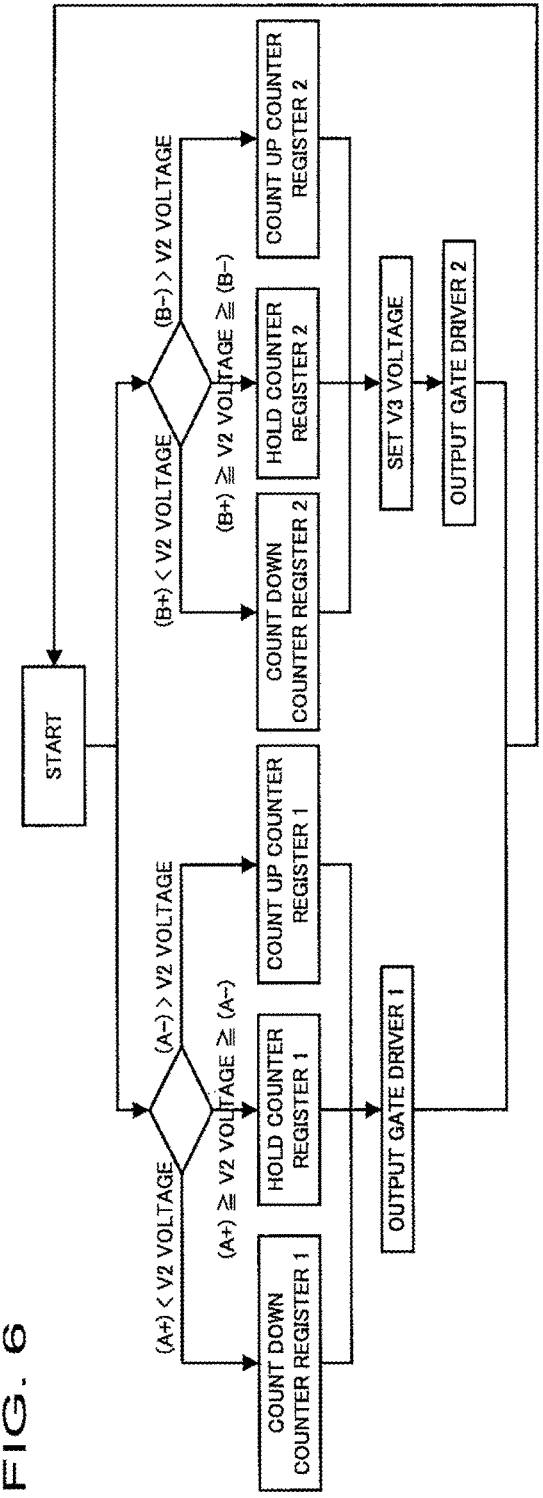
FIG. 6 is a flowchart illustrating software control of a converter CB1 and a converter CB2 in the basic principle circuit according to the second embodiment.

A description is given on control of FIGS. 5 and 6.

To the converter CB1 of FIG. 5, the method of controlling described with reference to FIG. 1 is directly applied. Thus, a description is given on the converter CB2.

Figure 7:
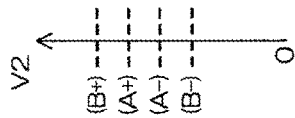
FIG. 7 is a graph illustrating a relationship of control thresholds of the converter CB1 and the converter CB2 according to the second embodiment.

The thresholds of the converter CB2 is the threshold (B+) and the threshold (B−), and as illustrated in FIG. 7, values thereof are set to be outside of the threshold (A+) and the threshold (A−) of the converter CB1. Normally, the voltage V2 of the common DC bus is controlled to be within the range of the threshold (A+) and the threshold (A−) and does not reach the threshold (B+) and the threshold (B−), whereby the up/down counter register RT2 of the converter CB2 stays within a control dead zone and does not make ups and downs.

More specifically, when the up/down counter register RT2 counts the voltage V2 that is equal to or smaller than the smallest threshold (B−), the gate pulse, which is an output from the gate driver GD2, is output so as to increase an ON time of the switching element S4 and to decrease an ON time of the switching element S3. On the other hand, when it counts the voltage V2 equal to or greater than the largest threshold (B+), the gate pulse, which is an output from the gate driver GD2, is output so as to decrease the ON time of the switching element S4 and to increase the ON time of the switching element S3. Furthermore, when the voltage V2 is between the threshold (B−) and the threshold (B+), the up/down count register RT2 selects to hold the count value.

Here, setting of the threshold (B+) itself and the threshold (B−) itself is described. As described above, in a circuit according to the second embodiment, in the same way as that in the first embodiment, a power conversion direction is reversed between a load/power source P1 and the load/power source P2, and the voltage V2 fluctuates within the range of the threshold (A+) and the threshold (A−). Then, it is suitable to set the threshold (A+) and the threshold (A−) described above as a range in which the voltage V2 can be regarded as being substantially constant or requiring only a small correction. In addition, in general, it is suitable to set the threshold (B+) and the threshold (B−) such that a difference therebetween is a value from 5% to 10% of an absolute value of the voltage V2. Note that a relationship of threshold (B−)<threshold (A−)<threshold (A+)<threshold (B+) is maintained at this time.

Control of the converter CB2 is control for converting the voltage V2 of the common DC bus into the voltage V3 demanded by the load/power source P2 in accordance with a demand of the system.

Since the converter CB2 is a converter for adapting the voltage to a form demanded by the load/power source P2, the basic method for controlling does not change even with an alternating current power source.

Reversal of the power conversion direction between the load/power source P1 and the load/power source P2 according to the second embodiment relates to a setting of the voltage V3 on the load/power source P2 side, and in a case where the circuit according to the second embodiment is applied to control of a vehicle, for example, the setting of the voltage V3 changes between a case where the vehicle is accelerated as an accelerator thereof is pressed upon driver's will and a case where the vehicle is decelerated as the accelerator is released. Here, in a case where the load/power source P2 is a so-called motor generator, an alternating current is used, and for the voltage V3, a voltage, a frequency, and a phase need to be set.

INDUSTRIAL APPLICABILITY

As described above, the present invention can be used in a field of a power conversion apparatus, and more specifically, it is particularly effective when used in a field of a power conversion apparatus connected between load/power sources capable of mutually giving and receiving electricity.

REFERENCE SIGNS LIST 10, 20 MPU
CB, CB1, CB2 converter
SS1, SS2 power conversion apparatus
S1, S2, S3, S4 switching element
DT detection unit
P1, P2 load/power source
RT, RT1, RT2 up/down counter register
GD, GD1, GD2 gate driver
L1, L2 reactor
C1, C2, C3 capacitor

The invention claimed is:

1. A power conversion apparatus configured to perform power conversion not limiting a direction of power flow between a first load or power source and a second load or power source, the power conversion apparatus being connected to the first load or power source and the second load or power source capable of mutually giving and receiving electricity, the power conversion apparatus comprising:
 a first converter connected to the first load or power source and a common DC bus, the first converter including a first switching element and a second switching element, wherein
 the second switching element is connected in parallel to the first load or power source, the first switching element serially connected to the second switching element is connected in parallel to the common DC bus together with the second switching element, and the first switching element and the second switching element alternately perform switching operation;

a second converter connected in parallel to the first converter through the common DC bus and connected also to the second load or power source, the second converter including a third switching element and a fourth switching element alternately performing switching operation;

a detection means configured to detect a voltage of the common DC bus, the detection means having a first threshold, a second threshold, a third threshold, and a fourth threshold in a relationship of first threshold<second threshold<third threshold<fourth threshold;

a first up or down counter register configured to allow a first power control means to generate a first gate pulse for increasing an ON time of the second switching element and decreasing an ON time of the first switching element upon counting the voltage of the common DC bus equal to or smaller than the second threshold, to allow the first power control means to generate a first gate pulse for decreasing the ON time of the second switching element and increasing the ON time of the first switching element upon counting the voltage of the common DC bus equal to or greater than the third threshold, and to select to hold a count value when the voltage of the common DC bus is between the second threshold and the third threshold;

a second up or down counter register configured to allow a second power control means to generate a second gate pulse by counting up in a direction of increasing a voltage of the second load or power source or increasing a voltage of the common DC bus in a case where the electricity is supplied from the second load or power source to the common DC bus, and by counting down in a direction of increasing a load of the second load or power source or decreasing the voltage of the common DC bus while increasing the voltage of the second load or power source in a case where the electricity is supplied to the second load or power source;

the first power control means configured to control operation of the first switching element and the second switching element by generating each of the first gate pulses corresponding to the count value of the first up or down counter register; and the second power control means configured to control operation of the third switching element and the fourth switching element by generating the second gate pulse corresponding to the count value of the second up or down counter register, wherein the first converter follows a change of a voltage of the first load or power source, and the second converter is capable of variably controlling the voltage of the second load or power source.

2. The power conversion apparatus according to claim 1, wherein
the first load or power source is a power storage apparatus.

3. The power conversion apparatus according to claim 1, wherein
the second load or power source is an alternating current power source.

* * * * *